UNITED STATES PATENT OFFICE.

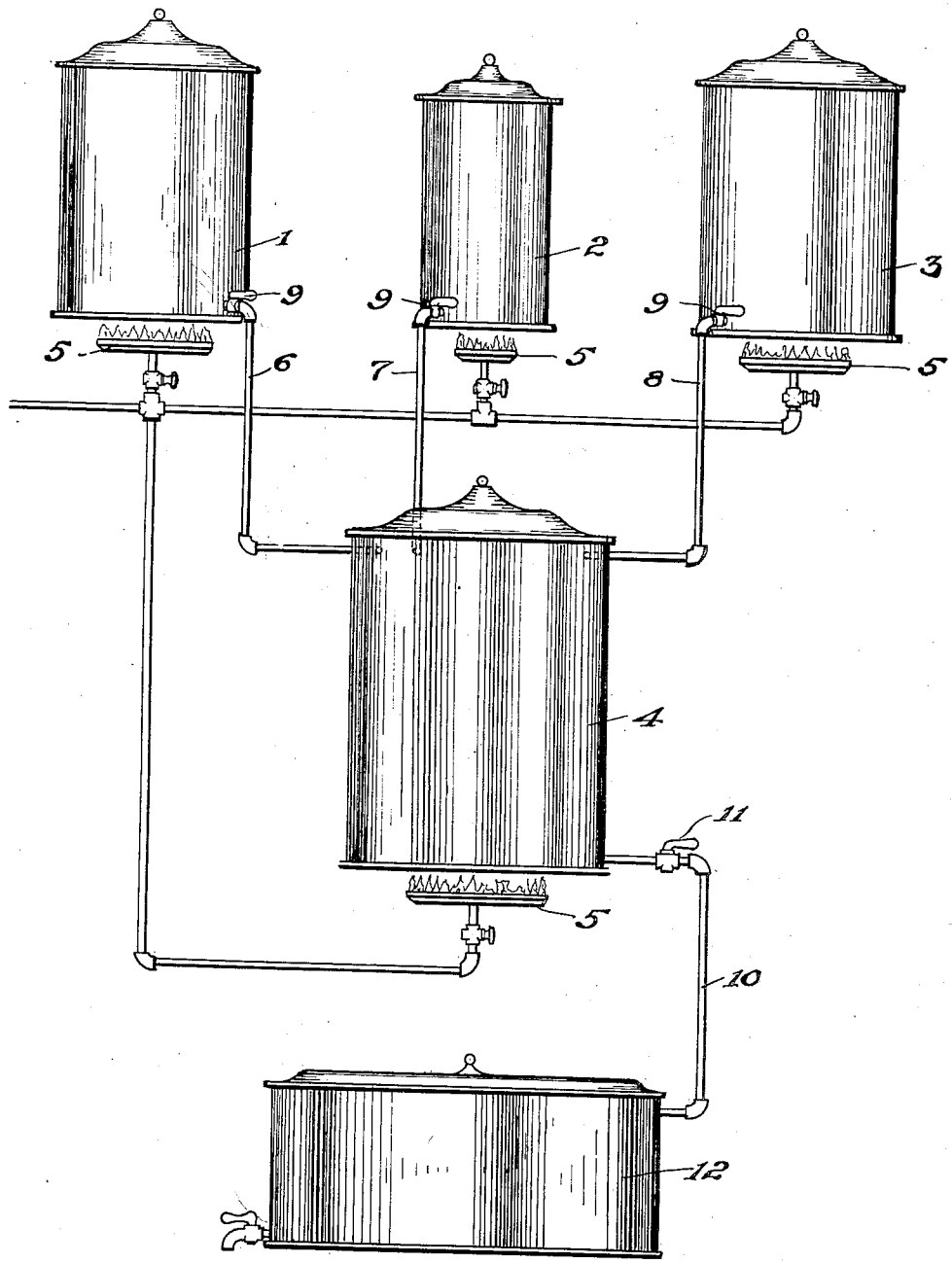

JOSEPH T. MONCRIEF, OF BIRMINGHAM, ALABAMA.

PROCESS OF COMPOUNDING A COMMERCIAL ESSENCE OF TEA.

1,094,675.   Specification of Letters Patent.   Patented Apr. 28, 1914.

Application filed June 12, 1913. Serial No. 773,320.

*To all whom it may concern:*

Be it known that I, JOSEPH T. MONCRIEF, a citizen of the United States of America, residing at Birmingham, in the county of Jefferson and State of Alabama, have invented certain new and useful Improvements in Processes for Compounding a Commercial Essence of Tea, of which the following is a specification.

The object of my invention is to perfect a process whereby the essence of tea may be economically extracted and compounded into a syrup from which either hot or cold tea or soda fountain drinks based upon tea, may be made.

One object of my invention is to reduce the cost without impairing the excellence of my product and this I accomplish by compounding my tea essence as a blend, utilizing a large percentage of low grade or inexpensive tea which is selected for its strength and has its essence fully extracted, and a small percentage of a high grade or expensive tea which is selected for its aromatic properties and has its essence carefully extracted to preserve in it the full strength of the aroma of the tea. The blended essence thus has both strength and aroma and, being principally derived from the less expensive tea from which all the flavor is extracted, it can compete with tea for domestic use for there but a small part of the essence of the tea leaves is generally extracted and when all the strength is obtained it is at a sacrifice of the aroma.

A further object of my process is to mix the resultant essence obtained by the blending of the extracts from both qualities of teas with sugar or saccharine syrup and add a substance adapted to prevent fermentation of the syrup.

I have found that a certain character of apparatus facilitates the operation of my process and I have illustrated such in the accompanying drawings.

The preferred manner of carrying my process into effect is as follows: I provide four boilers 1, 2, 3 and 4, and provide each with a burner 5 or any suitable heating means. The boilers 1 and 2 are designed for use in extracting the essence of tea to be blended. I fill the larger boiler 1 with cold water and introduce therein the strong and inexpensive tea from which I obtain the greater percentage of tea essence used. The tea and water are brought to a boil together with the boiler covered and the boiling is continued until the full strength of the tea has been extracted. The expensive aromatic tea is put into the small boiler 2 after the water therein has come to a boil and is left in the covered boiler only a short time, just sufficient to produce a highly aromatic tea extract therefrom. In the boiler 3 I place sugar and a small quantity of water and boil it to produce a thick saccharine syrup. The quantity of water used and the length of time the syrup is boiled being dependent on the thickness desired for the resultant extract syrup. I find it desirable to produce a thicker and more highly flavored extract syrup for soda fountain use than for domestic use. These three boilers 1, 2 and 3 are porcelain lined and are provided with glass or glass lined pipes 6, 7 and 8, respectively, each having a valve 9 therein and each being arranged to discharge into the large boiler 4 which stands on a lower level than the other boilers.

A strong tea essence produced in boiler 1 is practically without aroma, due to the grade of the tea and the process of treatment. I have found that by adding to four parts of this strong essence, one part of the highly aromatic essence from the boiler 2, I get both strength and aroma to the desired degree in the resulting blend, which takes place in boiler 4 into which is also charged syrup from boiler 3. I have obtained satisfactory results from the use of a syrup containing six pounds of sugar to the gallon of blended tea essence. The combined tea essence and syrup are thoroughly mixed in the boiler 4 and are preferably boiled therein to insure a better mixture and to the better preserve the resulting syrup extract from fermentation.

After boiling in vessel 4, the extract syrup is run through a glass pipe 10 under control of a valve 11 into an open container or vat 12 and there allowed to cool. While the syrup extract as thus carefully compounded will keep well, I prefer to add to it when cool sixteen grains of benzoate soda for every quart of syrup, or sixty-four grains to the gallon, which is one-tenth of one per cent. of the fluid extract treated.

This process will prevent any fermentation of the extract and enable it to be kept indefinitely without deterioration. The blended tea syrup will have the requisite strength and aroma and can be added to hot, cold or carbonated water to produce hot or cold tea, or a soda fountain drink at a low cost, due to the economical manner of extracting the essence from the tea used.

Having thus described my invention, what I claim as new and desire to secure by Letters Patent, is:—

1. The hereindescribed process of producing a syrup extract of tea which consists in extracting the full strength from a quantity of tea in a covered boiler, obtaining a highly aromatic extract of tea, blending a small quantity of such aromatic extract with a larger quantity of the strong extract first described, combining such extracts with a saccharine syrup, and boiling the resulting compound to produce a syrup extract of tea.

2. The hereindescribed process of producing a syrup extract of tea which consists in blending a large percentage of a strong extract of low grade tea with a small percentage of a highly aromatic extract of high grade tea, adding sugar to the blended extracts, and boiling same to produce a syrup.

3. The hereindescribed process of producing a syrup extract of tea which consists in blending a large percentage of a strong extract of low grade tea with a small quantity of a highly aromatic extract of high grade tea, adding sugar to the blended extracts, boiling same to produce a syrup, and adding to the syrup when cool a preservative compound to counteract any tendency to ferment.

4. The hereindescribed process of producing a syrup extract of tea which consists in making two extracts of different teas, one a high grade aromatic tea, the other a low grade strong tea, adding a small percentage of aromatic extract to the strong extract, combining and boiling the blended extracts with a sugar syrup comprising about six pounds of sugar to the gallon of extract, and adding a preservative compound to the resultant syrup extract.

5. The hereindescribed process of producing a syrup extract of tea which consists in treating a low grade strong tea to extract therefrom its full strength, treating a high grade aromatic tea to obtain a highly aromatic extract therefrom, blending substantially one part of the aromatic extract with four parts of the strong extract, mixing the blended extract with a syrup formed of six pounds of sugar to the gallon of extract, boiling the resulting mixture in a closed vessel, allowing the syrup extract to cool, and adding one-tenth of one per cent. of benzoate of soda to the syrup extract when cool.

In testimony whereof I affix my signature in presence of two witnesses.

JOSEPH T. MONCRIEF.

Witnesses:
WM. C. PRICKETT,
NOMIE WELSH.